March 6, 1962 R. B. TILNEY 3,023,591
RATE OF FLOW CONTROL SYSTEM FOR REFRIGERATION
Filed Sept. 8, 1958 2 Sheets-Sheet 1
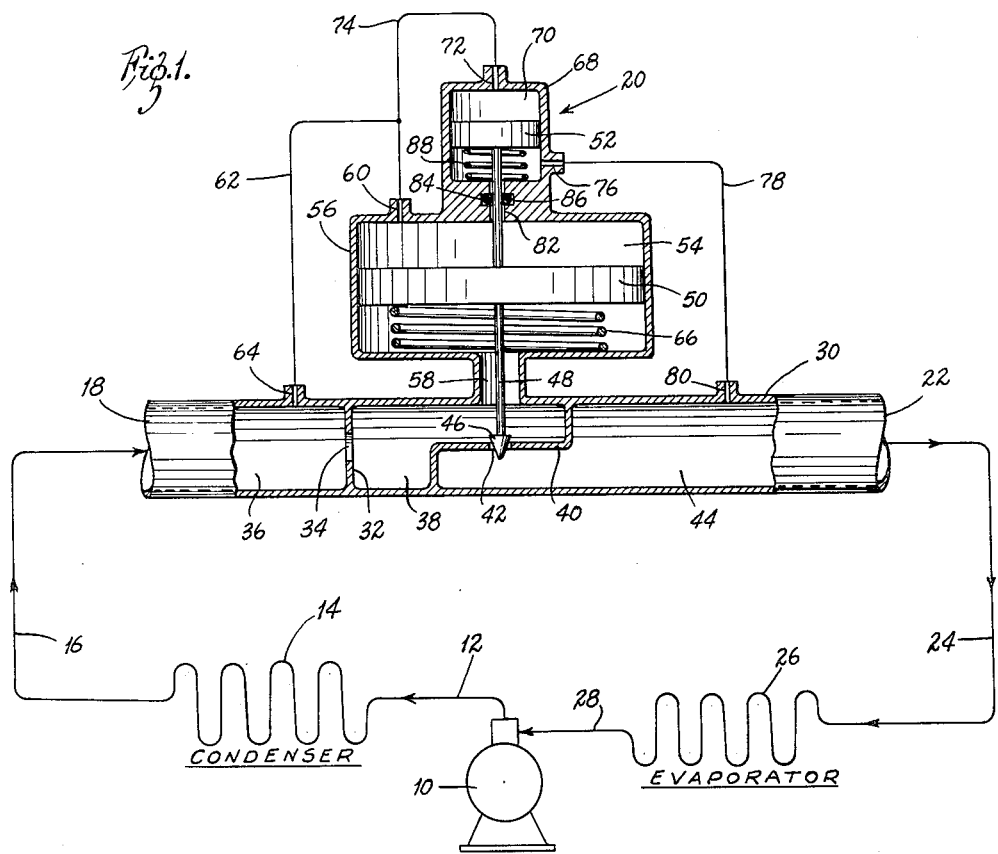
INVENTOR:
RALPH B. TILNEY,
By Kingsland, Rogers & Ezell
ATTORNEYS

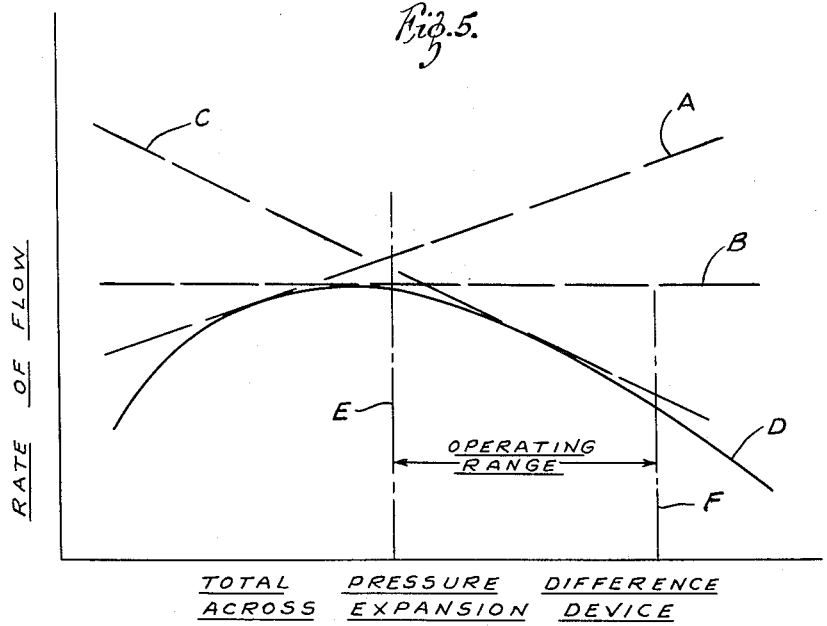

3,023,591
Patented Mar. 6, 1962

**3,023,591
RATE OF FLOW CONTROL SYSTEM
FOR REFRIGERATION**
Ralph B. Tilney, Clayton, Mo., assignor to Alco Valve Company, St. Louis, Mo., a corporation of Missouri
Filed Sept. 8, 1958, Ser. No. 759,561
12 Claims. (Cl. 62—204)

The present invention relates generally to a novel refrigeration system, and more particularly to a novel control for metering the flow of refrigerant through a closed circuit refrigeration system of the type employing a compressor, a condenser, a refrigerant expansion device, and an evaporator.

In brief, the invention contemplates a system of the foregoing type in which the expansion device is adapted to meter the refrigerant flow in predetermined correspondence with variations in total pressure drop from one side of the device to the other. In a preferred embodiment of the invention, a "measuring" orifice of fixed size is disposed in series with a "metering" orifice of variable size. The fluid pressures immediately upstream and downstream of each of these orifices is employed, along with appropriate mechanical biasing means, to maintain the aforesaid correspondence of flow with pressure drop.

Of particular significance in the present invention is the ability to obtain any reasonable "flow characteristic" through the expansion device, whereby this device may be employed either to maintain a constant rate of flow, or, in the alternative, to control in a manner automatically to compensate for changed conditions in other parts of the closed system and still maintain a selected operating condition, such, for example, as predetermined suction pressure. As another example of flexibility in the present invention, the control may effect a flow characteristic which provides a substantially constant power requirement for a selected compressor.

The expansion device employed for control in the invention may be of relatively simple construction and, being inherently self-equalizing, may be constructed as a fully enclosed assembly without external taps for equalization.

It is an object of the present invention, therefore, to provide a novel refrigeration system in which the flow of refrigerant fluid is metered in predetermined accordance with the operating characteristics of the major operating components of the system.

It is another object of the invention to provide a novel expansion device in a closed refrigerating circuit, which device responds to the total pressure drop thereacross in controlling the flow of refrigerant fluid therethrough.

It is another object of the invention to provide a novel expansion device for use in a closed refrigerating circuit, which device can be readily adapted to maintain system suction pressures in desired conformance with a predetermined characteristic variation in compressor performance.

It is another object of the invention to provide a control for a refrigeration system which employs a fixed orifice and a variable orifice in series arrangement.

It is another object of the invention to provide a control of the foregoing type in which fluid pressure downstream from both orifices is utilized to influence the size of opening through the variable orifice.

It is another object of the invention to provide a novel expansion device adapted for controlling a refrigerating system which has relatively few moving parts, which is simple and economical to construct and to install, and which is otherwise well adapted to its intended purpose.

The foregoing, along with additional objects and advantages, will be apparent from the following description of the invention, reference being made to the accompanying drawings, in which:

FIGURE 1 is a diagrammatic representation of a refrigeration system conforming to the present invention, the expansion device being shown in enlarged medial section;

FIGURE 2 is a schematic medial section through a modified type of expansion device;

FIGURE 3 is a detail view showing a piston face;

FIGURE 4 is a medial section through a preferred modification of the expansion device of the invention; and FIGURE 5 is a graph illustrating certain operating characteristics of the disclosed refrigeration system.

Directing more particular attention to FIGURE 1, the illustrated refrigeration system includes a compressor 10 having a principal outlet pipe 12 connected into a condenser 14. From the condenser, a pipe 16, which may incorporate conventional receivers, is connected into an inlet end 18 of an expansion device designated generally by the numeral 20. Continuing around the circuit, an outlet end 22 of the device 20 is connected by a pipe 24 to an evaporator 26, and a pipe 28 then communicates the evaporator back into the suction side of the compressor 10. The general arrangement of major components of the disclosed refrigeration system is well known, and it may be understood that the components themselves, with the exception of the expansion device 20, are of generally conventional construction.

The device 20, shown schematically in FIGURE 1, includes fluid conducting means in the form of a pipe 30 extending from the upstream inlet 18 to the downstream outlet 22. The pipe 30 is divided into three distinct sections by means of internal structure defining spaced orifices therein. Thus, an apertured partition 32 defining a fixed orifice 34 demarcates an upstream section 36 from an intermediate section 38. Similarly, a partition 40 provided with an orifice aperture 42 demarcates the intermediate section 38 from a downstream section 44.

A conical valve member 46 cooperates with the orifice 42 to vary the size of opening therethrough, as will appear. The valve 46 is mounted at the lower end of a valve rod 48 movable with a piston 50 and extending thereabove for securement also to a second piston 52. The relatively large piston 50 is disposed for reciprocation in a piston chamber 54 defined by a cylinder 56. The portion of the chamber 54 which is below the piston 50 is communicated directly with the intermediate pipe section 38 through a connecting passage 58. This passage also accommodates the rod 48. The portion of the chamber 54 which is above the piston 50 is communicated through a port 60, a pipe 62, and a port 64 to the upstream pipe section 36. A compression spring 66 disposed in the chamber 54 below the piston 50 acts upon the latter to urge it upwardly in a direction to enlarge the opening through the orifice 42.

A cylinder 68 surmounts the cylinder 56 and defines a chamber 70 which slidably accommodates the relatively small piston 52. The portion of the chamber 70 above this piston is communicated through a port 72 and a pipe 74 to the aforementioned pipe 62 and hence to the upstream pipe section 36. The portion of the chamber 70 below the piston 52 is communicated through a port 76, a pipe 78, and a port 80 to the downstream pipe section 44. The valve rod 48 extends from the large piston chamber 54 through a bore 82 to reach the small piston chamber 70, and this bore is sealed against fluid leakage by an O-ring 84 disposed in an annular groove 86. A compression spring 88 disposed in the piston chamber 70 beneath the small piston 52 biases the latter upwardly and thus tends also to enlarge the opening through the orifice 42.

The schematic representation of FIGURE 2 depicts an expansion device, designated generally by the numeral 100, connected between the lines 16 and 24 in place of the above-described expansion device 20. The device 100 includes a flow pipe 102 which extends from an inlet end 104 to an outlet end 106 and which includes an enlarged cylindrical section 108 defining a piston chamber 110. Adjacent the downstream end of the piston chamber 110, there is provided a sleeve portion 112 concentric with the pipe 102 and the cylindrical section 108. Within the enlarged portion of the pipe 102, but externally of the sleeve portion 112, there is provided an annular recess 114 which is open to the downstream end of the piston chamber 110. The sleeve section 112 projects axially through the recess 114 as an inner extension of the downstream end of the pipe 102. Apertures 116 are provided near the fixed end of the sleeve 112 and serve to intercommunicate the recess 114 with the downstream end of the pipe 102.

A piston 118 is disposed for reciprocation in the piston chamber 110 and has secured thereto an axial valve rod 120 which projects into the sleeve 112 for valving co-operation with the apertures 116. Preferably, the valve rod 120 is closely fitted within the sleeve 112, as by lapping, so as to provide a smooth sliding, non-leaking fit. The piston 118 is provided with opposed circular recesses 121 intercommunicated by small openings or orifices 122, and is also accurately fitted within the cylindrical portion 108 so that predetermined communication is achieved from one side of the piston to the other. It will, of course, be recognized that an alternative construction capable of achieving the same cross communication with respect to the piston 118 would involve only the elimination of the orifices 122 and the peripheral sizing of the piston 118 to provide the desired communication past the edges thereof.

A compression spring 124 disposed on the downstream side of the piston 118 urges the latter in a direction tending to open the orifices 116.

Attention is directed to the fact that the device 100, like the previously described device 20, is divided into three distinct sections in series communication. In the device 100 there are an upstream section on the upstream side of the piston 118, an intermediate section 128 between the piston 118 and the orifices 116, and a downstream section 130 downstream from the orifices 116.

FIGURE 4 depicts a still further modified expansion device which may be connected between the lines 16 and 24 of the refrigeration circuit. This device, designated generally by the numeral 150, comprises an inlet pipe 152 and an outlet pipe 154 interconnected by a diaphragm housing 156 provided with a flexible diaphragm 158 having a circular arrangement of perforations 160 therein. The outlet pipe 154 connected downstream from the diaphragm 158 is provided with an apertured plug 161. The plug 161 threadedly engages the pipe 154 and has a cross slot 162 by means of which it can be adjusted axially of the direction of fluid flow. The upstream end of the plug 161 terminates in a flat annular face 164 which defines the upstream end of an axial passage 166 communicating downstream with the interior of the pipe 154. A compression spring 168 disposed within the housing 156 on the downstream side of the diaphragm 158 biases the latter in an upstream direction and hence away from the aforementioned annular face 164 of the plug 161. A cup washer 170 is interposed between the spring 168 and the diaphragm 158 to distribute the spring force.

Attention is directed to the fact that the expansion device 150, like the devices 20 and 100 previously described, defines three distinct interior sections. In the device 150, these are an upstream section 172 on the upstream side of the diaphragm 158, an intermediate section 174 between the diaphragm 158 and the apertured plug 161, and a downstream section 176 downstream of the annular face 164 of the plug 161.

*Operation*

The refrigeration system of the present invention, shown in full circuit in FIGURE 1, operates in a generally conventional manner insofar as the compressor 10, which is assumed to be a constant displacement device, delivers a refrigerant fluid, for example, Freon 22, in the form of a compressed gas through the line 12 into the condenser 14. The fluid is condensed and preferably subcooled a predetermined minimum degree, as will appear, and is then conducted by the liquid line 16 to the expansion device 20. As previously indicated, either of the expansion devices 90 or 150 may be substituted for the device 20. The fluid enters the expansion device as a subcooled liquid, and leaves it as a mixture of liquid and saturated gas in generally conventional proportion. The mixture enters the evaporator wherein the liquid is boiled into vapor, and the latter then flows through the suction line 28 back into the compressor 10.

From the foregoing, it is evident that the amount of refrigerant which flows through the described cycle in a given period of time is largely a function of the position of the valve member 46 in the orifice 42. As is well known, however, the pressure drop across this orifice also has direct influence upon the rate of flow therethrough. This well known relationship between pressure drop across an orifice and the flow therethrough applies also to the fixed orifice 34, and, since the fluid which flows through the fixed orifice 34 remains a liquid, it is evident that changes in pressure drop between the upstream section 36 and the intermediate section 38 will accurately reflect a changed rate of flow through the system. Conversely, any tendency toward change in rate of flow will change the pressure drop between the section 36 and the section 38 and hence will change the pressure conditions on the two sides of the piston 50. Thus, whereas the variable orifice 42 has primarily a metering function, the fixed orifice 34 has a measuring function.

If the mass rate of refrigerant flow should increase slightly, the resulting increased difference in pressure above and below the piston 50 will urge this member in a direction to close the valve 46 and thus tend to reduce the rate of flow back to its original value. Movement of the piston 50 in this direction, however, will necessarily compress the spring 66 and, as a result, the spring force exerted upwardly beneath the piston 50 will be increased. By selecting a spring 66 having an appropriate spring gradient, the response of the valve 46 to pressure changes across the measuring orifice will be such as to give the control a positive "flow characteristic," which is to say that the rate of flow will increase slightly with increased pressure difference across the orifice.

It should be emphasized that the flow from the upstream section 36 through the orifice 34 into the intermediate section 38 is liquid flow throughout and therefore subject to well known characteristics of liquid flow through the orifices. The fluid remains a liquid despite the existence of a pressure difference between the sections 36 and 38 due to the aforementioned subcooling of the liquid admitted into the section 36.

As the fluid leaves the intermediate section 38 and enters the downstream section 44, a portion of it is converted to gas. Furthermore, whereas the difference in pressure between the upstream section 36 and the intermediate section 38 will usually amount to only a few pounds per square inch, 2 to 5 p.s.i. for example, the pressure difference between the intermediate section 38 and the downstream section 44 will amount to many times as much, 100 to 200 p.s.i. difference being typical. The sum of these two pressure drops, namely, the difference in pressure which exists between the upstream section 36 and the downstream section 44 is exerted across the piston 52 in a direction which tends to close the metering orifice 42 in proportion to this total pressure difference. The magnitude of the pressure difference is such that the compression spring 88, or its equivalent, is necessary to provide a balanced condition for the movable valve 46.

It may be mentioned at this point that, inasmuch as the springs 66 and 88 act upon rigid interconnected structure in the same direction, one of them could of course be eliminated and the other changed in design to provide the desired spring rate or spring gradient available with the combined springs.

Clearly, then, the pressure bias produced at the small piston 52 tends to close the valve 46 with increase in total pressure difference across the expansion device 20, which tendency is reflected as a negative "flow characteristic" in the device. By suitable variation of the dimensions of the several parts, along with appropriate spring design, the tendency for a positive flow characteristic produced through cooperation of the fixed measuring orifice 34 with the relatively large piston 50 and its spring 66 is balanced against the tendency for a negative flow characteristic produced through the total pressure difference acting across the relatively small piston 52, so that any reasonable flow characteristic, positive, negative, or constant, can be provided.

The foregoing is represented graphically in FIGURE 5, wherein the broken lines A, B, and C illustrate in a very general sense the aforesaid positive, constant, and negative flow characteristics. By appropriate proportionment of the cooperating elements in the expansion device 20, then, changes in total pressure difference across the device can be caused to vary the rate of flow in either an increasing or a decreasing direction, or to maintain it constant, as desired. The solid line curve D in FIGURE 5 is generally representative of the operation of a typical expansion device constructed in accordance with the foregoing principles. While the curve D includes portions having both positive and negative flow characteristics, it will be understood that shaping and positioning of such a curve through proportioning and sizing of parts will provide a desired characteristic throughout a selected operating range. For example, within an operating range defined by the vertical lines E and F, the curve D follows quite closely the negative flow characteristic indicated by the straight line C.

In the schematic refrigeration system of FIGURE 1, the expansion device 20 is assumed to provide a negative flow characteristic which closely matches the "negative pumping characteristic" of the compressor 10 (most compressors pump less volume of gas as the compression ratio is increased, due primarily to the effects of the clearance volume), and the action of the device will therefore be such as to maintain a substantially constant suction pressure. Thus, through dynamic action the device 20 produces a result similar to that of a constant pressure regulator, or automatic expansion valve, which operates on static pressure principles.

By "tailoring" the flow characteristic of the expansion device 20 to be more negative than the negative pumping characteristic of a standard compressor, the refrigerant flow can be controlled to limit the maximum power requirement of the compressor under increased refrigerating load.

The expansion device 100 illustrated in FIGURE 2 functions in accordance with the same principles which govern the operation of the device 20. As previously indicated, the measuring orifice may comprise either the peripheral clearance around the piston 118 or the passages 122, or it may of course include both in combination. The pressure of the upstream chamber 126 and that of the intermediate chamber 128 act on opposite sides of the piston 118, and the relatively small pressure difference is balanced by the compression spring 124.

As is clear from the illustration, the free end of the valve stem 120 is subject to the pressure existing in the downstream chamber 130, so that the end area of this stem corresponds to the small piston 52 in the device 20. The device 100 employs the previously suggested expedient of using a single spring to balance the net forces tending to close the valve.

The configuration of the device 100 makes unnecessary the employment of external lines for communicating the pressures to the appropriate sides of the piston areas. This eliminates possible sources of leakage and makes possible a fully enclosed assembly of relative small size, well adapted for connection into a piping system.

The expansion device 150 illustrated in FIGURE 4 represents a preferred construction which, again functions in accordance with the same principles which govern the operation of the devices 20 and 100. Thus, the diaphragm 158 corresponds to the relatively large pistons 50 and 118 aforementioned. The apertures 160 comprise the fixed measuring orifice through which the fluid flows from the upstream section 172 into the intermediate section 174. The pressure difference between these sections acts to influence the position of the center portion of the diaphragm 158 with respect to the end annulus 164 of the orifice plug 160. Since it is clear that the fluid flowing from the intermediate section 174 through the passage 166 into the downstream section 176 must flow between the annulus 164 and the adjacent side of the diaphragm 158, it will be equally obvious that movements of the diaphragm toward and away from this annulus will effectively vary the area of inlet so as to meter the flow therethrough. Hence, it is the cylindrical surface area between the annulus 164 and the diaphragm 158 which is the metering orifice in the device 150.

In addition to the aforementioned influence of the pressure difference between the sections 172 and 174 acting across the diaphragm 158 to vary the metering orifice opening, the pressure existing in the downstream section 176 will be effectively imparted to a central area of the diaphragm which is directly opposite the passage 166 and approximately of equal area. The pressure of the upstream section 172 is, of course, exerted against the opposite side of this diaphragm area, so that, as in the case of the devices 20 and 100, there is provided a biasing force which varies in accordance with the full pressure drop between the upstream and downstream sides of the device. This force, as does that effected by the pressure drop across the measuring orifice, tends to close the variable metering orifice and, once more, is opposed by a single spring 168 which performs the combined functions attributed to the springs 66 and 88 in the previously described valve 20.

Clearly, there has been described a rate of flow control system for refrigeration which fulfills the objects and advantages sought therefor.

It is to be understood that the foregoing description and the accompanying drawings have been given only by way of illustration and example. It is further to be understood that changes in the form of the elements, rearrangement of parts, or the substitution of equivalent elements, all of which will be obvious to those skilled in the art, are contemplated as being within the scope of the invention, which is limited only by the claims which follow.

What is claimed is:

1. A refrigeration system comprising a compressor, a condenser, an expansion device and an evaporator piped in series and containing a refrigerant fluid, said expansion device comprising movable metering valve means, and including means responsive to differential pressures between selected points in the device, the latter means being subjected to the total fluid pressure differential existing across the expansion device, the metering valve means having direct connection with the means responsive to differential pressures for metering the flow of refrigerant fluid in response to variations in the differential pressures, and means responsive to the rate of flow of refrigerant fluid through the expansion device for maintaining predetermined correspondence between the fluid flow through the system and the pumping characteristic of the compressor.

2. A refrigeration system comprising a compressor, a condenser, an expansion device and an evaporator piped in series and containing a refrigerant fluid, said expansion device comprising movable metering valve means, and including means responsive to differential pressures between selected points in the device, the metering valve means having direct connection with the means responsive to differential pressures for metering the flow of refrigerant fluid in response to variations in the differential pressures, and means responsive to the rate of flow of refrigerant fluid through the expansion device, including a measuring orifice of fixed size which accommodates the total fluid flow through the system for maintaining predetermined correspondence between the fluid flow through the system and the pumping characteristics of the compressor.

3. The system of claim 1 wherein the condenser is effective to deliver subcooled liquid to the expansion device for flow through the measuring orifice, and wherein the size of the measuring orifice is sufficient to prevent flash of any portion of the fluid into gas as a result of pressure drop thereacross.

4. In a control for a refrigeration system having a compressor, a condenser, an expansion device, and an evaporator piped in series, the combination wherein the expansion device comprises a valve, means to position the valve to maintain a constant evaporator pressure, and means to displace the valve as a function of the rate of flow through the system.

5. The combination of claim 4 wherein the expansion device includes means defining an orifice area of fixed size, means responsive to differential fluid pressures existing on opposite sides of said orifice area, said latter means including movable valve means for varying the fluid flow through the device, and mechanical biasing means having a predetermined progressive biasing force in correspondence with closing movement of the valve means.

6. The combination of claim 5 wherein the valve means is downstream from the fixed orifice area and wherein the expansion device includes a movable element responsive to the difference in pressure existing at the upstream side of the orifice area and at the downstream side of the valve means.

7. In a control for a refrigeration system having a compressor, a condenser, an expansion device, and an evaporator piped in series, the combination wherein the expansion device comprises means defining an upstream fluid chamber, an intermediate fluid chamber, and a downstream fluid chamber, a movable wall interposed between said upstream chamber and said intermediate chamber, movable valve means interposed between said intermediate chamber and said downstream chamber, means interconnecting said movable wall with said movable valve means for corresponding movement therebetween, and passage means of fixed area between said upstream and intermediate chambers.

8. The combination of claim 7 wherein the passage means comprises apertures formed in the movable wall.

9. The combination of claim 8 wherein movement of the wall in a downstream direction causes the valve means to move in a closing direction.

10. The combination of claim 9 wherein the valve means takes the form of a valve rod movable in an apertured sleeve.

11. The combination of claim 8 wherein the valve means comprises an apertured plug terminating in an annular face, said face being disposed adjacent and parallel to an opposed surface of the movable wall.

12. The combination of claim 11 wherein the movable wall takes the form of a flexible diaphragm.

References Cited in the file of this patent

UNITED STATES PATENTS

| 1,578,179 | Shrode | Mar. 23, 1926 |
| 2,021,881 | Askin | Nov. 26, 1935 |
| 2,058,908 | Philipp | Oct. 27, 1936 |
| 2,195,925 | Hoesel | Apr. 12, 1940 |
| 2,219,408 | Benz | Oct. 29, 1940 |
| 2,326,093 | Carter | Aug. 3, 1943 |

FOREIGN PATENTS

| 563,981 | Great Britain | Sept. 7, 1944 |